(12) United States Patent
Bao

(10) Patent No.: US 9,533,552 B2
(45) Date of Patent: Jan. 3, 2017

(54) FILTER COMPONENT FOR MOTOR VEHICLE AIR CONDITIONING

(71) Applicant: Valeo Automotive Air Conditionning Hubei Co., Ltd., Hubei (CN)

(72) Inventor: Tao Bao, Hubei (CN)

(73) Assignee: VALEO AUTOMOTIVE AIR CONDITIONING HUBEI CO., Hubei (CN)

( * ) Notice: Subject to any disclaimer, the term of this patent is extended or adjusted under 35 U.S.C. 154(b) by 118 days.

(21) Appl. No.: 14/539,581

(22) Filed: Nov. 12, 2014

(65) Prior Publication Data

US 2015/0128808 A1 May 14, 2015

(30) Foreign Application Priority Data

Nov. 13, 2013 (CN) .......................... 2013 1 0571999

(51) Int. Cl.
| | |
|---|---|
| *B01D 46/00* | (2006.01) |
| *B01D 46/10* | (2006.01) |
| *B32B 5/18* | (2006.01) |
| *B60H 3/06* | (2006.01) |
| *B01D 46/52* | (2006.01) |
| *B60H 1/24* | (2006.01) |
| *B01D 46/42* | (2006.01) |
| *B60H 1/00* | (2006.01) |

(52) U.S. Cl.
CPC ......... *B60H 3/0608* (2013.01); *B01D 46/0023* (2013.01); *B01D 46/0027* (2013.01); *B01D 46/4236* (2013.01); *B01D 46/521* (2013.01); *B60H 1/24* (2013.01); *B60H 2001/006* (2013.01)

(58) Field of Classification Search
CPC ..... B01D 46/00; B01D 46/10; B01D 46/0023; B01D 46/0039; B01D 46/4236; B32B 5/18
USPC ......... 55/385.3; 96/380, 381, 383, 384, 388; 264/45.3, 46.4, 50, 255, DIG. 6; 156/247
See application file for complete search history.

(56) References Cited

U.S. PATENT DOCUMENTS

| | | | | |
|---|---|---|---|---|
| 5,622,662 A | * | 4/1997 | Veiga | ........................ B32B 5/18 156/247 |
| 2005/0279212 A1 | * | 12/2005 | Amann | .............. B01D 46/0023 96/380 |
| 2009/0178879 A1 | * | 7/2009 | Park | ........................ B01D 46/10 181/224 |

* cited by examiner

Primary Examiner — Jacob T Minskey
Assistant Examiner — Minh-Chau Pham
(74) Attorney, Agent, or Firm — Howard & Howard Attorneys PLLC

(57) ABSTRACT

A filter component for motor vehicle air conditioning including a filtration part made of a material able to filter air and a noise reduction part made of a material able to reduce noise. Also disclosed is a filtration assembly which includes the filter component, and a motor vehicle air conditioning device including the filtration assembly.

19 Claims, 9 Drawing Sheets

FILTER COMPONENT FOR MOTOR VEHICLE AIR CONDITIONING

CROSS-REFERENCE TO RELATED APPLICATIONS

This application claims priority to and all the advantages of Chinese Patent Application No. CN 201310571999.0, filed on Nov. 13, 2013, the content of which is incorporated herein by reference.

TECHNICAL FIELD

The present invention relates to a filter component for motor vehicle air conditioning, in particular to a filter component which has two functions, namely noise reduction and filtration.

BACKGROUND ART

A motor vehicle air conditioning system is an apparatus which cools, heats, replaces and purifies the air inside a vehicle cabin. It can provide passengers with a comfortable travelling environment, lessen driver fatigue, and improve travelling safety. In recent years, the rapid development of the motor vehicle industry has spurred corresponding developments in motor vehicle air conditioning. As people have seen their material living standards rise, they have begun to demand a higher level of comfort in motor vehicles, and thus to make demands relating to the noise produced by motor vehicle air conditioning. The principal source of noise in a motor vehicle air conditioning system is the blower, and for this reason, the search for a way to reduce the noise produced by blowers has already become a focus of research and development in the field of motor vehicle air conditioning systems. Those skilled in the art already know that the filter in a motor vehicle air conditioning system is generally located close to the blower, so that by replacing the filter with a device for air conditioning that not only has an air filtration function but also has a noise reduction function, it is possible to control the noise produced by the blower effectively while maintaining the filtration function. Thus, the object of the present invention is to provide a filter component for motor vehicle air conditioning with two functions, namely filtration of air and noise reduction.

CONTENT OF THE INVENTION

The present invention provides a filter component for motor vehicle air conditioning, comprising a filtration part and a noise reduction part, wherein the filtration part is made of a material able to filter air, and the noise reduction part is made of a material able to reduce noise.

In a filter component according to an embodiment of the present invention, one of the filtration part and noise reduction part is formed as a structural component, the structural component comprising a receiving part for receiving another material, and the other one of the filtration part and noise reduction part filling the receiving part.

By way of example, the structural component in a filter component according to an embodiment of the present invention is a plate component having a length direction, a width direction and a height direction which are perpendicular to each other, and having a cavity formed in the interior thereof, the cavity being the receiving part mentioned above. The cavity may be filled with a material different to that from which the structural component is made, so as to furnish the filter component with an additional function. A device for motor vehicle air conditioning made in this way will have two functions, namely air filtration and noise reduction.

The filter component according to an embodiment of the present invention further comprises at least one first compartment wall, for dividing the cavity into multiple compartments. Many arrangements of the first compartment wall are possible. By way of example, the first compartment wall may extend in a direction substantially parallel to the width direction and a direction substantially parallel to the height direction, to divide the cavity into multiple long and narrow compartments substantially parallel to the width direction of the plate component. Similarly, the first compartment wall may extend in a direction substantially parallel to the length direction and substantially parallel to the height direction, to divide the cavity into multiple long and narrow compartments substantially parallel to the length direction of the plate component. Similarly, the first compartment wall may extend in a direction which substantially makes an acute angle with the length direction and in a direction parallel to the height direction, to divide the cavity into multiple slanting long and narrow compartments.

Preferably, the filter component described above further comprises a second compartment wall extending in a direction parallel to the height direction and intersecting with the first compartment wall. Preferably, the second compartment wall and the first compartment wall are mutually perpendicular.

In a filter component according to another embodiment of the present invention, the first compartment wall extends in a direction parallel to the length direction and a direction parallel to the width direction, to divide the cavity into multiple flat compartments perpendicular to the height direction.

Furthermore, the filter component according to another embodiment of the present invention further comprises a second compartment wall and a third compartment wall which intersect with each other, the second and third compartment walls extending in the height direction. Preferably, the second compartment wall and third compartment wall are mutually perpendicular. More preferably, the second compartment wall is parallel to the length direction.

By way of example, the structural component in the filter component according to another different embodiment of the present invention is a pleated article comprising multiple folds, with gaps between adjacent folds being the receiving part for receiving other material.

Preferably, the multiple folds are spaced apart at equal intervals.

The material with an air filtration function as described above is any material able to filter air that is known to those skilled in the art and suitable for use in the filter of a motor vehicle air conditioning system, and may for example be one of the following or a combination of more than one thereof: non-woven fabric, paper, felt cloth, etc.

The material with a noise reduction function as described above is any material able to reduce noise that is known to those skilled in the art and suitable for reducing noise in a motor vehicle air conditioning system, and may for example be one of the following or a combination of more than one thereof: foam material, macromolecular material, porous material, stone wool, etc.

The present invention also provides a filtration assembly for motor vehicle air conditioning, comprising at least one of the devices for motor vehicle air conditioning described above, and in particular comprising more than one of the filter components described above. The multiple filter components may be fitted together or stacked in any suitable way, for example, stacked in one of the length direction, the width direction and the height direction of the plate component or pleated article, to further enhance the air filtration and noise reduction functions thereof.

Furthermore, the present invention further provides a motor vehicle air conditioning system, comprising the motor vehicle air conditioning assembly described above, and realizing the air filtration and noise reduction functions of the filter component.

The above description and the following embodiments, which are explained with reference to the accompanying drawings, are by no means restrictive, but illustrate the technical solution of the present invention purely by way of examples. Those skilled in the art will understand that there are changes to the embodiments below which do not depart from the scope of the present invention. The scope of protection of the present invention is defined by the attached claims.

DESCRIPTION OF THE ACCOMPANYING DRAWINGS

The following accompanying drawings are referred to below in a non-limiting illustrative way, to better show the structure of the filter component according to embodiments of the present invention.

PARTICULAR EMBODIMENTS

Referring to the accompanying drawings described above, the filter component for motor vehicle air conditioning according to an embodiment of the present invention comprises a filtration part 1 and a noise reduction part 2, wherein the filtration part 1 is made of a material able to filter air, while the noise reduction part 2 is made of a material able to reduce noise.

In particular, according to an embodiment of the present invention, one of the filtration part 1 and noise reduction part 2 is formed as a structural component 10, the structural component 10 comprising a receiving part for receiving another material, and the other one of the filtration part 1 and noise reduction part 2 filling the receiving part. To facilitate explanation, in this example the structural component 10 of the filter component is formed by the filtration part 1, while the noise reduction part 2 fills the receiving part of the structural component. However, those skilled in the art will understand that the structural component 10 of the filter component could alternatively be formed by the noise reduction part 2, with the filtration part 1 filling the receiving part of the structural component 10, without departing from the spirit of the present invention.

Figure 1A:
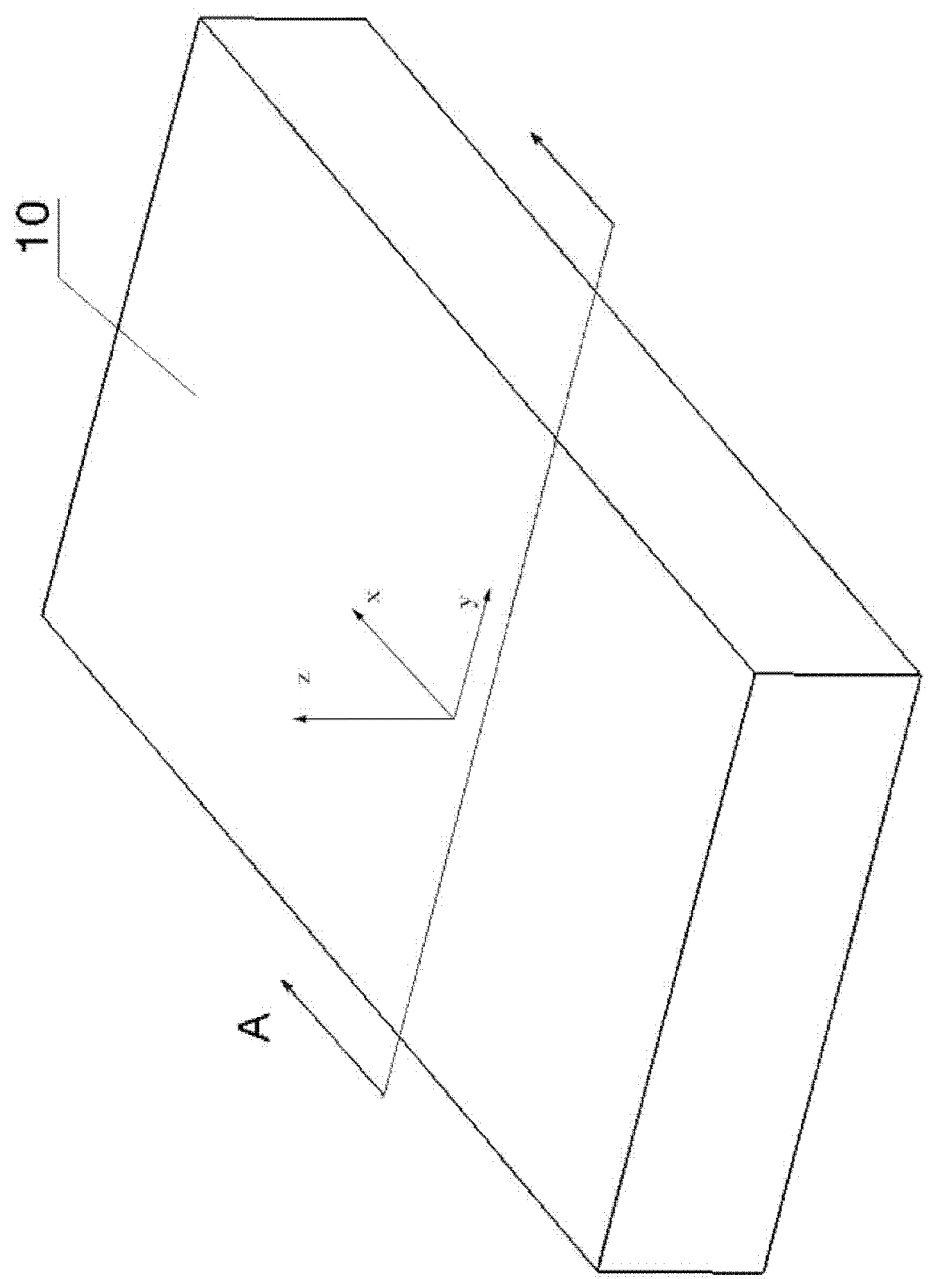
FIG. 1(a) is a perspective view of a filter component according to an embodiment of the present invention.

By way of example rather than to impose a limitation, the filter component for motor vehicle air conditioning according to the present invention is described with reference to a Cartesian coordinate system herein below, as FIG. 1(a) shows, wherein the x direction is the length direction in the following text, the y direction is the width direction in the following text, and the z direction is the height direction in the following text. It should be understood that the definitions given here for the length, width and height directions are given purely to facilitate description, and do not constitute a specific limitation of the spatial relationship of the filter component in relation to the installation position thereof and/or the airflow direction. Those skilled in the art will also understand based on the teaching herein that in scenarios which do not depart from the scope of protection of the present invention, the specific definitions of the length, width and height may be replaced accordingly, as long as the three directions still form a mutually orthogonal relationship.

Figure 1B:
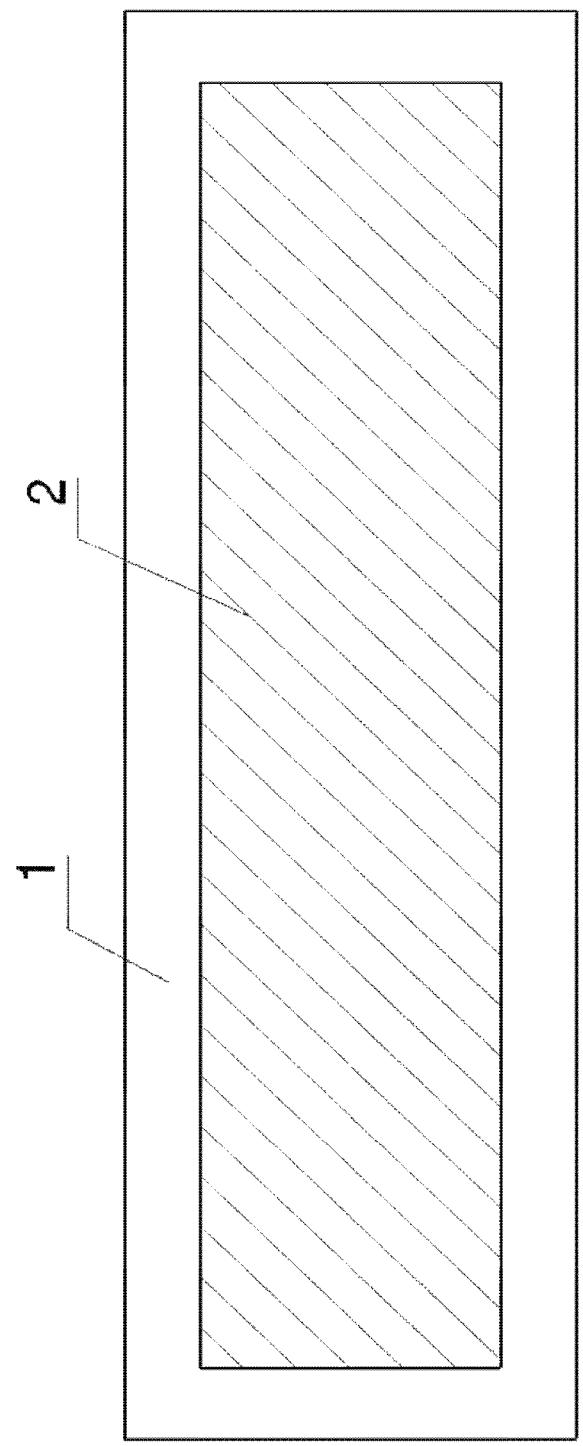
FIG. 1(b) is a sectional view taken along the line A-A in FIG. 1(a)

By way of example, as FIGS. 1(a) and 1(b) show, the structural component 10 may be a plate component which may be closed, and comprises a cavity in the interior thereof, the cavity being the previously mentioned receiving part of the structural component, to be filled with, for example, noise reduction material to form the noise reduction part 2. The cavity may have any shape, and may for example be in the shape of a parallel polyhedron whose side parts are parallel to the corresponding side parts of the plate component 10, or a cylindrical shape of suitable dimensions, or any other three-dimensional shape suited to being inside the plate component 10. The noise reduction part 2 may partially or completely fill the cavity, as long as sufficient filtration capability and noise reduction capability can be guaranteed for the filter component.

In one embodiment of the present invention, the plate component 10 further comprises at least one first compartment wall 11, for dividing the cavity into multiple compartments filled with the noise reduction part 2. The compartment wall may have multiple different settings, which will be described in detail below. The settings of the compartment wall and changes to the specific settings thereof are for the purpose of satisfying differences in the filter component in terms of structural integrity and functionality requirements; these requirements often vary with the specific motor vehicle air conditioning system to which they are applied.

Figure 2A:
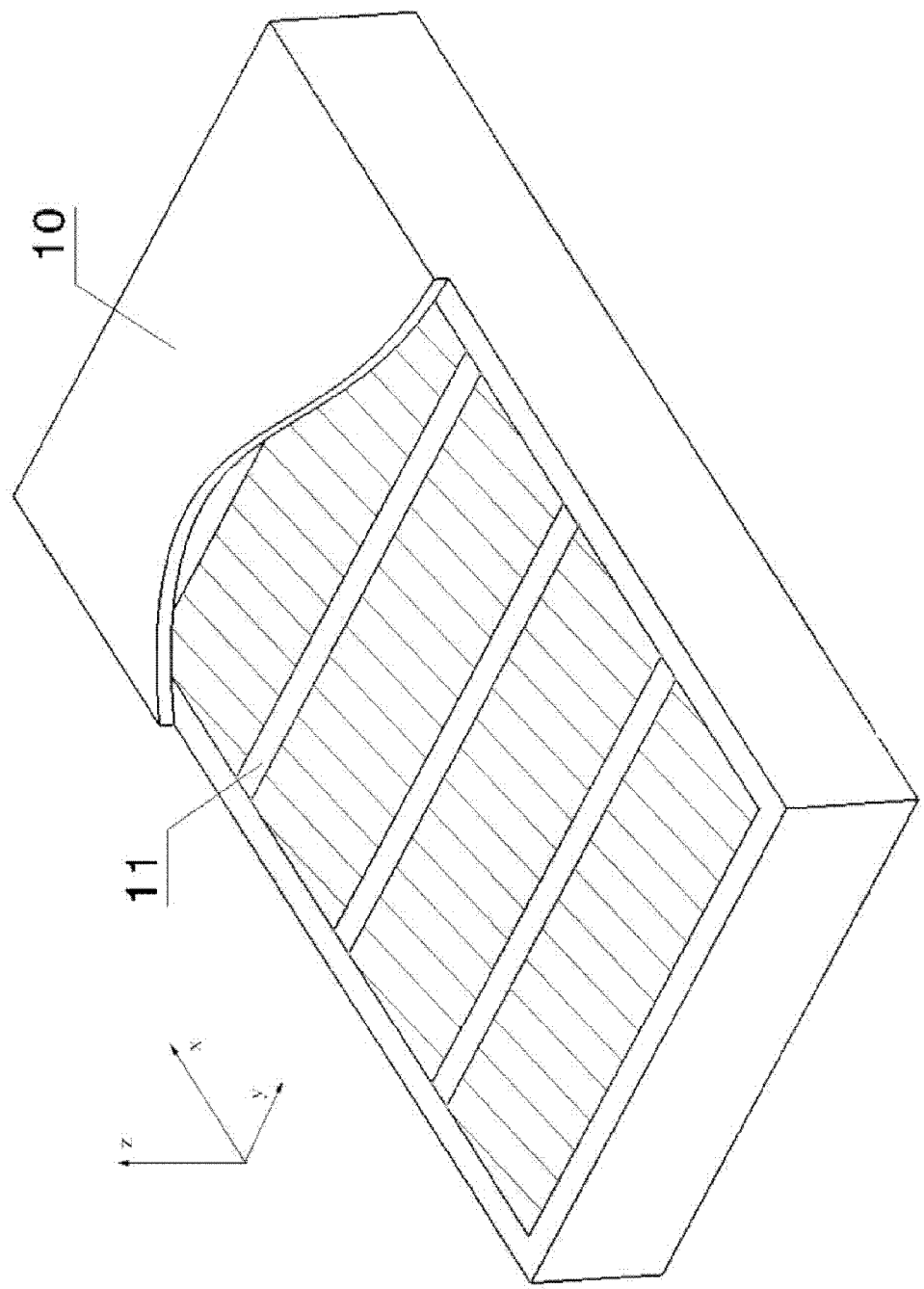
FIG. 2(a) is a perspective view of a filter component comprising first compartment walls according to another embodiment of the present invention, wherein part has been cut away to show the specific structure of the interior thereof.

Furthermore, the first compartment wall 11 may extend in a direction substantially parallel to the width direction y and a direction substantially parallel to the height direction z, to divide the cavity into multiple compartments. For example, the filter component according to an embodiment of the present invention may comprise one first compartment wall 11 extending in a direction substantially parallel to the width direction y and a direction substantially parallel to the height direction z, to divide the cavity into two long and narrow compartments which are substantially parallel to the width direction y of the plate component. Alternatively, the filter component according to another embodiment of the present invention may comprise multiple first compartment walls 11 extending in a direction substantially parallel to the width direction y and a direction substantially parallel to the height direction z, to divide the cavity into multiple long and narrow compartments which are substantially parallel to the width direction y of the plate component. By way of example, the filter component may comprise n of the abovementioned first compartment walls 11, dividing the cavity into n+1 compartments to be filled with the noise reduction part 2, as FIG. 2(a) shows. Preferably, the multiple first compartment walls 11 may be parallel to each other, and spaced apart at equal intervals in the length direction of the plate component.

Figure 2B:
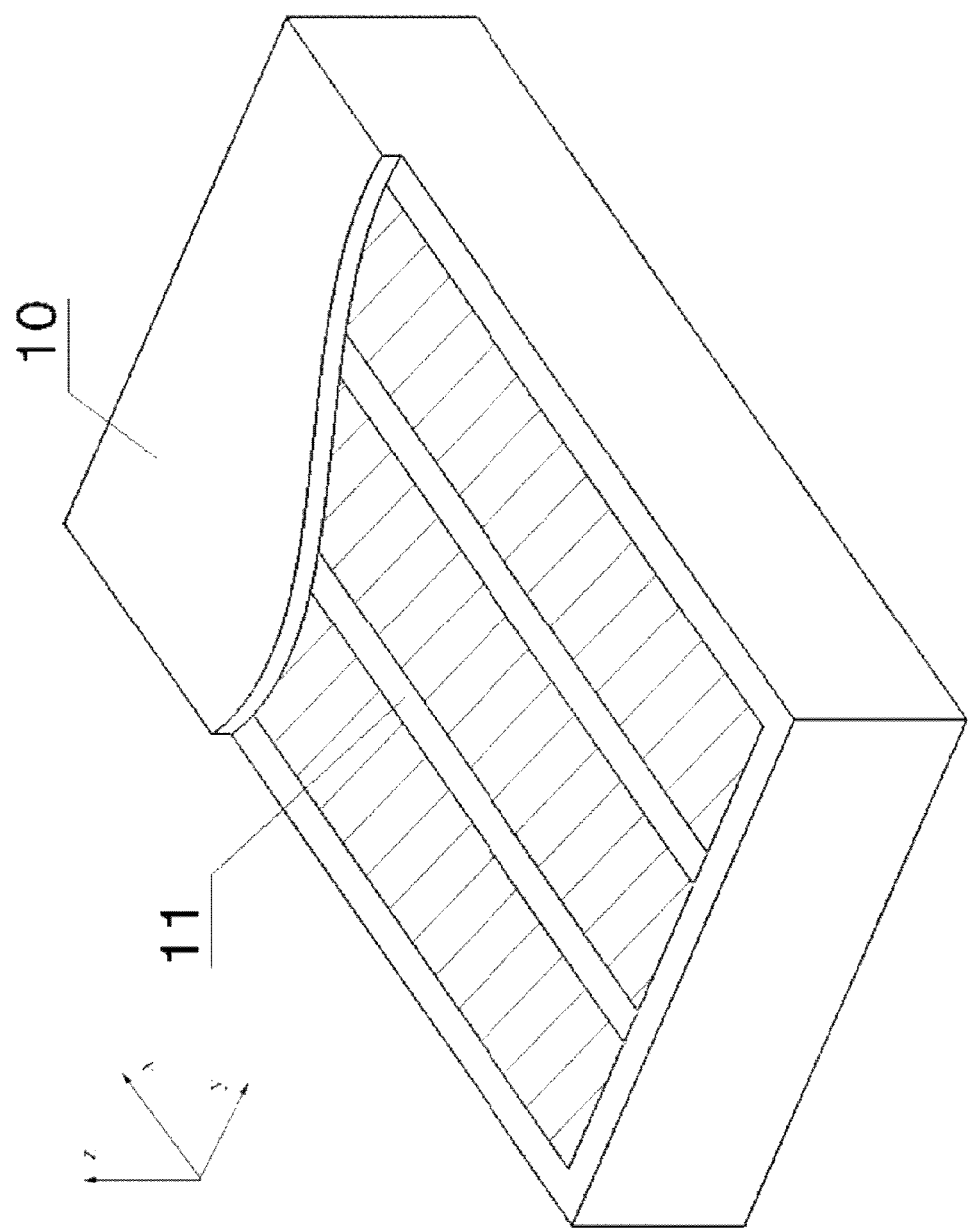
FIG. 2(b) is a perspective view of a filter component comprising first compartment walls according to another embodiment of the present invention, wherein part has been cut away to show the specific structure of the interior thereof.

Those skilled in the art will foresee that, alternatively, the first compartment wall 11 could extend in a direction substantially parallel to the length direction x and a direction substantially parallel to the height direction z, to divide the cavity into multiple long and narrow compartments substantially parallel to the length direction x of the plate component. For example, the filter component according to an embodiment of the present invention may comprise one first compartment wall 11 extending in a direction substantially parallel to the length direction x and a direction substantially parallel to the height direction z, to divide the cavity into two compartments. Alternatively, the filter component according to another embodiment of the present invention may comprise multiple first compartment walls 11 extending in a direction substantially parallel to the length direction x and a direction substantially parallel to the height direction z, to divide the cavity into multiple compartments. By way of example, the device for motor vehicle air conditioning may comprise n of the abovementioned first compartment walls 11, dividing the cavity into n+1 compartments to be filled with the noise reduction part 2, as FIG. 2(b) shows. Preferably, the multiple first compartment walls 11 may be parallel to each other, and spaced apart at equal intervals in the width direction y of the plate component 10.

Alternatively, the first compartment wall 11 may extend in a direction which substantially makes an acute angle with the length direction x and in a direction parallel to the height direction z, to divide the cavity into multiple slanting long and narrow compartments. For example, the device for motor vehicle air conditioning according to an embodiment of the present invention may comprise one first compartment wall 11 extending in a direction which substantially makes an acute angle with the length direction x and in a direction parallel to the height direction z, to divide the cavity into two compartments. Alternatively, the filter component according to another embodiment of the present invention may comprise multiple first compartment walls 11 extending in a direction which substantially makes an acute angle with the length direction x and in a direction parallel to the height direction z, to divide the cavity into multiple compartments.

Figure 2C:
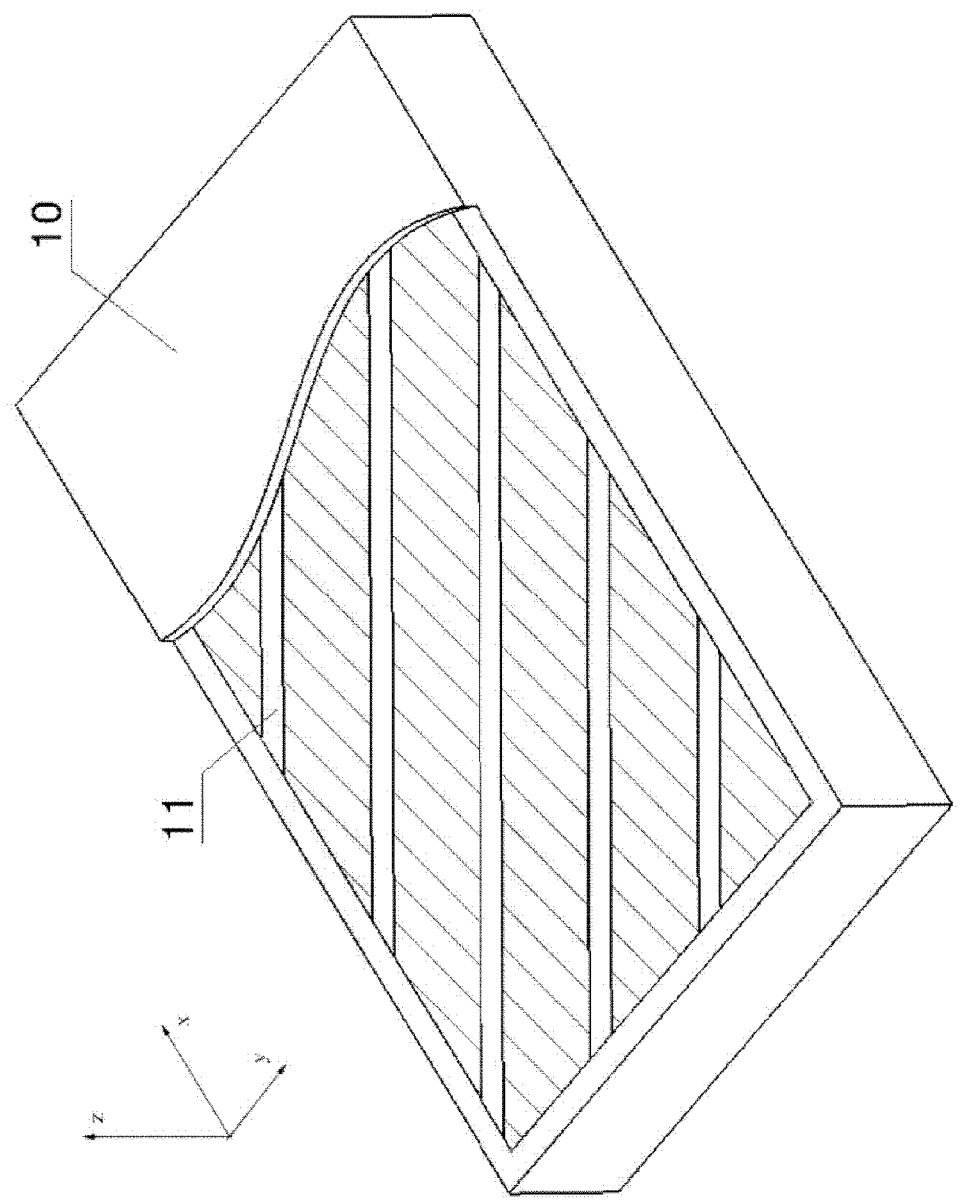
FIG. 2(c) is a perspective view of a filter component comprising first compartment walls according to another embodiment of the present invention, wherein part has been cut away to show the specific structure of the interior thereof.

By way of example, the filter component may comprise n of the abovementioned first compartment walls 11, dividing the cavity into n+1 compartments to be filled with the noise reduction part 2, as FIG. 2(c) shows. Preferably, the multiple first compartment walls 11 may be parallel to each other, and spaced apart at equal intervals in the width direction y of the plate component.

Figure 3:
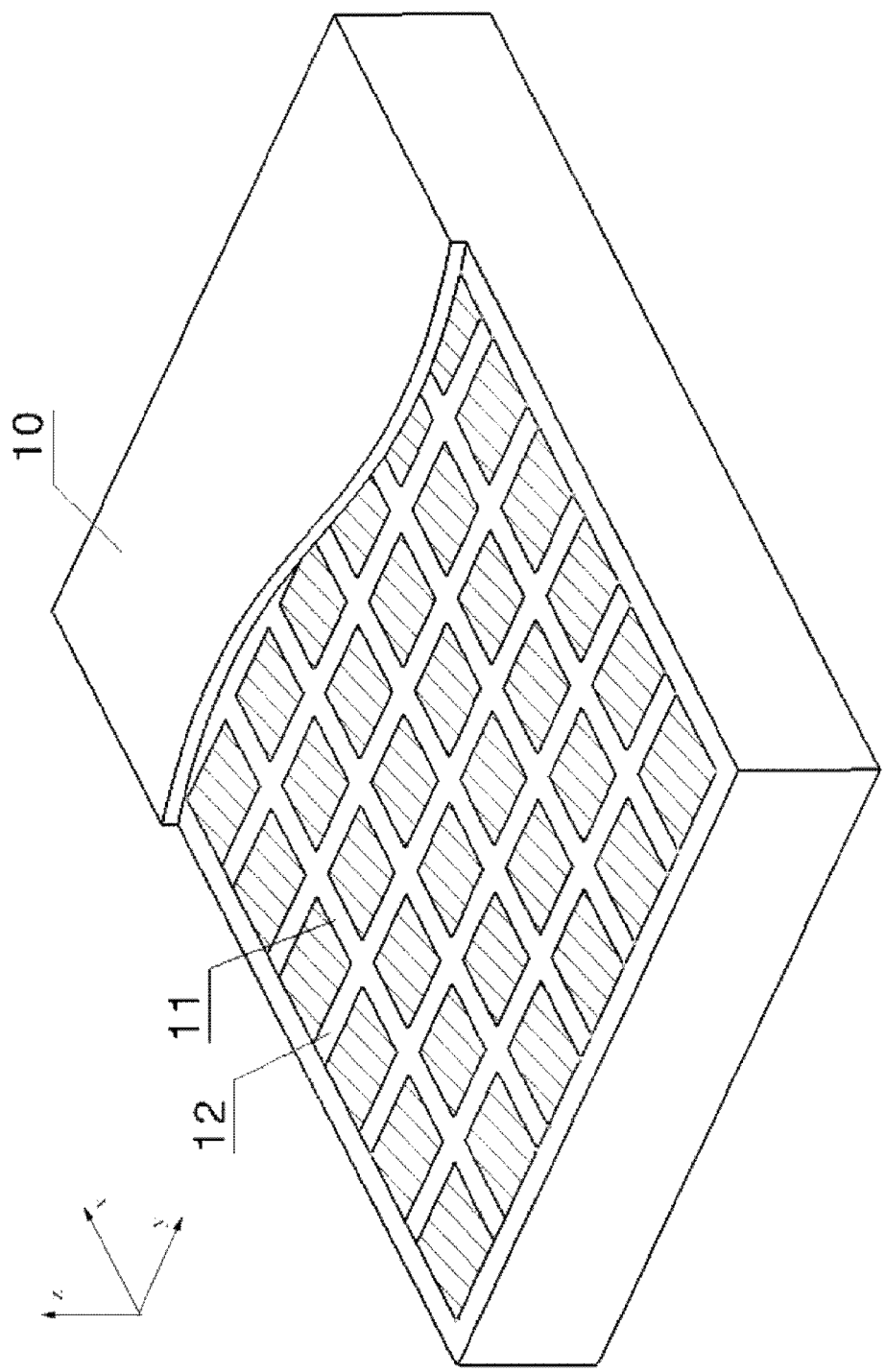
FIG. 3 is a perspective view of a filter component comprising first compartment walls and second compartment walls according to another embodiment of the present invention, wherein part has been cut away to show the specific structure of the interior thereof.

In another embodiment of the present invention, the compartment walls of the filter component further comprise at least one second compartment wall 12 extending in a direction substantially parallel to the height direction z and intersecting with the first compartment wall 11 described above, to divide the cavity into multiple compartments in the form of a grid. Preferably, the second compartment wall 12 and the first compartment wall 11 are mutually perpendicular, and divide the cavity into multiple compartments of rectangular or square cross section in the form of a grid. More preferably, if there are multiple second compartment walls 12, then these multiple second compartment walls 12 are parallel to each other and spaced apart at equal intervals. These compartments are filled with material able to reduce noise, to form the noise reduction part 2 of the filter component. The number of the first compartment walls 11 may be the same as or different from the number of the second compartment walls 12, depending on the specific requirements placed on the filter component. By way of example, in this embodiment, the device for motor vehicle air conditioning comprises m first compartment walls 11 and n second compartment walls 12, as FIG. 3 shows.

Thus, by way of example, in the case where the filter component comprises m first compartment walls 11 and n second compartment walls 12, the device for motor vehicle air conditioning comprises (m+1)*(n+1) compartments which are partitioned by the m first compartment walls 11 and n second compartment walls 12 as well as the side walls of the cavity, and are filled with the noise reduction part 2. Preferably, in the case where the filter component comprises multiple first compartment walls 11 and/or multiple second compartment walls 12, the multiple first compartment walls 11 are spaced apart at equal intervals in the length direction x of the plate component 10, and/or the multiple second compartment walls 12 are spaced apart at equal intervals in the width direction y of the plate component.

Figure 4A:
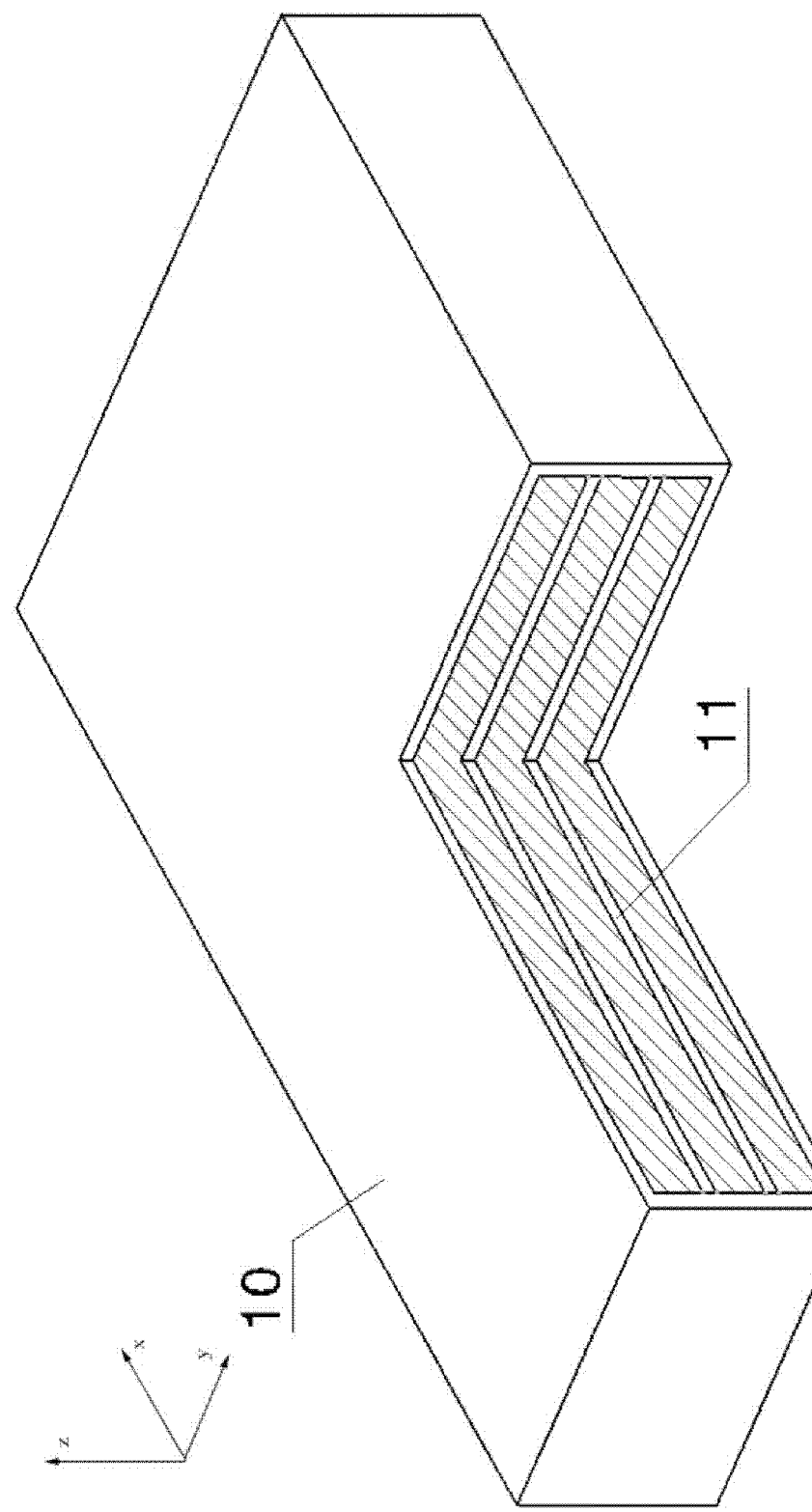
FIG. 4(a) is a perspective view of a filter component comprising first compartment walls according to still another embodiment of the present invention, wherein part has been cut away to show the specific structure of the interior thereof.
Figure 4B:
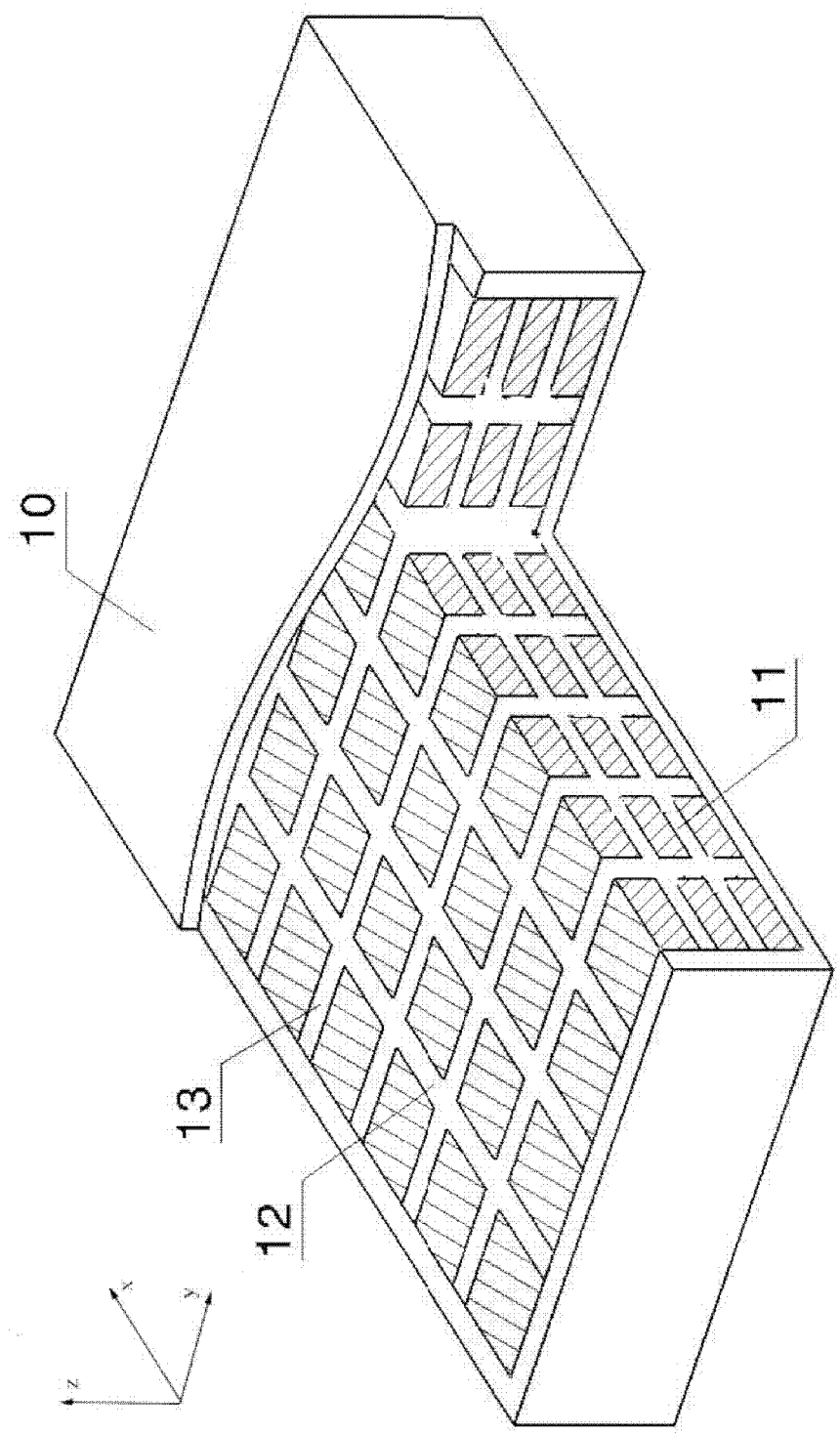
FIG. 4(b) is a perspective view of a filter component comprising first compartment walls, second compartment walls and third compartment walls according to another different embodiment of the present invention, wherein part has been cut away to show the specific structure of the interior thereof.

In a filter component according to another embodiment of the present invention, the plate component 10 may comprise a first compartment wall 11 extending in a direction parallel to the length direction x and a direction parallel to the width direction y, to divide the cavity into multiple flat cavities perpendicular to the height direction z, as shown in FIG. 4(a). As stated above, there may be one first compartment wall 11 or multiple first compartment walls 11, and in the case of there being multiple first compartment walls 11, preferably, the multiple first compartment walls 11 are spaced apart at equal intervals in the height direction z of the plate component 10.

In the case where the first compartment walls 11 are in the arrangement shown in FIG. 4(a), the plate component 10 further comprises a second compartment wall 12 and a third compartment wall 13 which intersect with each other, wherein the second compartment wall 12 and third compartment wall 13 both extend in the height direction z. In this case, the second compartment wall 12 and third compartment wall 13 both intersect with the first compartment walls 11, dividing the cavity of the plate component 10 into a greater number of compartments. Preferably, in the case where there are multiple second compartment walls 12 and/or multiple third compartment walls 13, the multiple second compartment walls 12/third compartment walls 13 are correspondingly spaced apart at equal intervals and parallel to each other. Preferably, in the case of a second compartment wall 12 and third compartment wall 13 intersecting with each other, the second compartment wall 12 and third compartment wall 13 are mutually perpendicular. Preferably, in this case the second compartment wall 12 is parallel to the length direction x.

Figure 5:
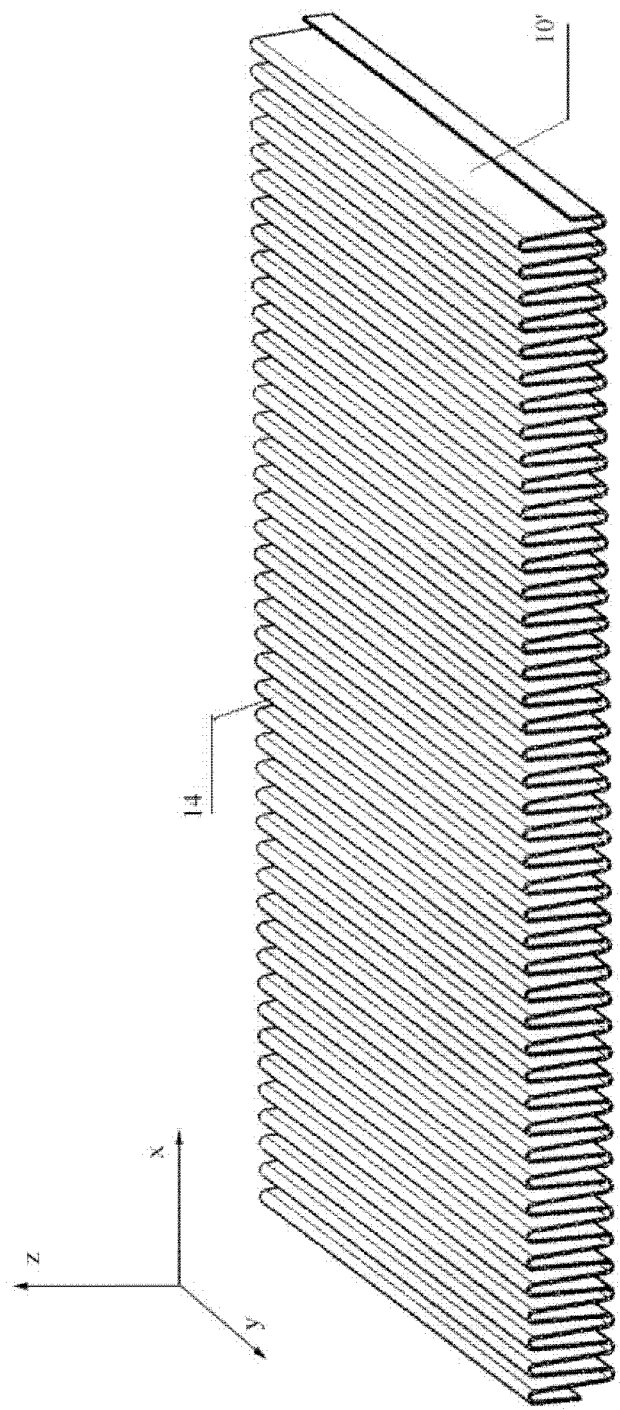
FIG. 5 is a perspective view of a filter component according to another different embodiment of the present invention, wherein the structural component is a pleated article.

As FIG. 5 shows, in a filter component according to another embodiment of the present invention, the abovementioned structural component 10' is a pleated article, which pleated article 10' comprises multiple folds 14, the gaps between adjacent folds 14 being the receiving part to be filled with the noise reduction part 2. Preferably, the multiple folds 14' in the pleated article 10' are spaced apart at equal intervals.

In the filter component according to the present invention, the material with an air filtration function that is used to make the filtration part 1 is any material able to filter air that is known to those skilled in the art and suitable for use in the filter of a motor vehicle air conditioning system, and may for example be one of the following or a combination of more than one thereof: non-woven fabric, paper, felt cloth, etc.

Furthermore, in the air conditioning device according to the present invention, the material with a noise reduction function that is used to make the noise reduction part 2 is any material able to reduce noise that is known to those skilled in the art and suitable for reducing noise in a motor vehicle air conditioning system, and may for example be one of the following or a combination of more than one thereof: foam material, macromolecular material, porous material, stone wool, etc.

Those skilled in the art will understand that the corresponding structural component and/or filling made from the above material exhibits not only rigidity which maintains structural integrity, but also flexibility associated with the material itself and/or the specific structural configuration, i.e. the abovementioned plate component can flex within a range permitted by its own flexibility when acted upon by a suitable force, to adapt to the requirements of a specific installation position.

The present invention also provides a motor vehicle air conditioning assembly, comprising at least one of the filter components described above, and in particular comprising more than one of the filter components described above. The multiple devices for motor vehicle air conditioning may be fitted together or stacked in any suitable way, for example, stacked in one of the length direction x, the width direction y and the height direction z of the plate component or pleated article, to further enhance the air filtration and noise reduction functions thereof.

Furthermore, the present invention further provides a motor vehicle air conditioning system, comprising the motor vehicle air conditioning assembly described above, and realizing the air filtration and noise reduction functions of the motor vehicle air conditioning device.

Although the above outline and detailed description present at least one illustrative embodiment, it should be understood that there are many areas where changes can be made. It should be understood that the one or more illustrative embodiments are no more than examples, and are not intended to define scope use or configuration in any way. Rather, the above outline and detailed description will furnish those skilled in the art with a convenient explanation which can be used to implement at least one illustrative embodiment, and it is understood that various changes may be made to the function and arrangement of the elements described in the illustrative embodiments, without departing from the scope expounded in the attached claims and the legal equivalent thereof.

The invention claimed is:

1. A filter component for motor vehicle air conditioning, comprising:
   a filtration part made of a material that filters air; and
   a noise reduction part made of a material that reduces noise,
   wherein one of the filtration part and the noise reduction part is a structural component of the filter component, the structural component comprising a receiving part for receiving another material, and the other one of the filtration part and the noise reduction part filling the receiving part, wherein the structural component is a plate component having a cavity formed in the interior thereof, and wherein the cavity is the receiving part, and wherein the plate component further comprises at least one first compartment wall therein for dividing the cavity into at least two compartments, the cavity being filled with the material that reduces noise to form the noise reduction part.

2. The filter component according to claim 1, wherein the first compartment wall extends in a direction parallel to a width direction of the plate component and a direction parallel to a height direction of the plate component, to divide the cavity into at least two compartments substantially parallel to the width direction of the plate component.

3. The filter component according to claim 1, wherein the first compartment wall extends in a direction parallel to a length direction of the plate component and parallel to a height direction of the plate component, to divide the cavity into multiple long and narrow compartments substantially parallel to the length direction of the plate component.

4. The filter component according to claim 1, wherein the first compartment wall extends in a direction which makes an acute angle with a length direction of the plate component, to divide the cavity into at least two slanting long and narrow compartments.

5. The filter component according to claim 1, further comprising at least one second compartment wall which extends and intersects with the first compartment wall.

6. The filter component according to claim 5, wherein the second compartment wall and the first compartment wall are mutually perpendicular.

7. The filter component according to claim 1, wherein the first compartment wall extends in a direction parallel to a length direction of the plate component and a direction parallel to a width direction of the plate component, to divide the cavity into at least two flat compartments perpendicular to a height direction of the plate component.

8. The filter component according to claim 7, further comprising a second compartment wall and a third compartment wall which intersect with each other, wherein the second compartment wall and the third compartment wall extend in the height direction.

9. The filter component according to claim 8, wherein the second compartment wall and the third compartment wall are mutually perpendicular.

10. The filter component according to claim 8, wherein the second compartment wall is parallel to the length direction.

11. The filter component according to claim 1, wherein the structural component is a pleated article comprising multiple folds, with gaps between adjacent folds being the receiving part.

12. The filter component according to claim 11, wherein the multiple folds are spaced apart at equal intervals.

13. The filter component according to claim 1, wherein the material that filters air is one of the following materials: non-woven fabric, paper and felt cloth.

14. The filter component according to claim 1, wherein the material that reduces noise is one of the following materials: foam material, macromolecular material, porous material and stone wool.

15. A filtration assembly for motor vehicle air conditioning, comprising multiple filter components according to claim 1.

16. The filtration assembly according to claim 15, wherein the multiple filter components are stacked.

17. A motor vehicle air conditioning device, comprising the filtration assembly according to claim 15.

18. The filter component according to claim 1, wherein each of the compartments are identical in size in a width direction of the plate component.

19. The filter component according to claim 1, wherein each of the compartments are identical in size in each direction of the plate component.

* * * * *